United States Patent [19]

van Aken et al.

[11] 4,329,233

[45] May 11, 1982

[54] PROCESS FOR THE PURIFICATION OF WATER

[75] Inventors: Andreas B. van Aken, Amsterdam, Netherlands; George C. Blytas, Houston, Tex.; René M. Visser, Amsterdam, Netherlands

[73] Assignee: Shell Oil Company, Houston, Tex.

[21] Appl. No.: 210,205

[22] Filed: Nov. 25, 1980

[30] Foreign Application Priority Data

Nov. 27, 1979 [NL] Netherlands .......................... 7908586

[51] Int. Cl.$^3$ ............................................... C02F 1/28
[52] U.S. Cl. .................................... 210/673; 210/691
[58] Field of Search ................ 210/673, 691, 908–910; 252/416, 459; 423/326, 331, 332

[56] References Cited

U.S. PATENT DOCUMENTS

| 1,756,624 | 4/1930 | Behrman | 423/123 |
| 3,755,183 | 8/1973 | Fahn et al. | 252/194 |
| 3,769,386 | 10/1973 | Rundell et al. | 423/263 |
| 4,208,305 | 6/1980 | Kouwenhoven et al. | 423/326 |
| 4,216,084 | 8/1980 | Ikari et al. | 210/691 |
| 4,238,318 | 12/1980 | Kouwenhoven et al. | 423/326 |
| 4,257,885 | 3/1981 | Grose et al. | 210/691 |

FOREIGN PATENT DOCUMENTS

2831611 2/1980 Fed. Rep. of Germany .
503847 4/1939 United Kingdom .
1334244 10/1973 United Kingdom .

*Primary Examiner*—Ivars C. Cintins

[57] ABSTRACT

A process for purification of water containing certain organic hetero compounds by contacting with certain crystalline iron silicates found to be unexpectedly efficient to adsorb said organic compounds from the water.

8 Claims, No Drawings

PROCESS FOR THE PURIFICATION OF WATER

BACKGROUND OF THE INVENTION

The invention relates to a process for the removal of organic compounds from water.

In the removal of organic compounds from water, the instance to improve the odor and taste of drinking water or to eliminate harmful substances in waste water from industries, active carbon is often used as the adsorbent. As a rule, the purification with active carbon is effected as the last step after one or more preceding purification steps, such as settling, filtration and similar processes. For the removal of organic compounds from water by adsorption on active carbon, the active carbon may be used in the form of a fixed bed as well as in fluidized form. After the active carbon has been loaded with organic compounds, it is usually regenerated, by which treatment the organic compounds are removed from the active carbon. The regeneration is usually performed by a high temperature treatment with an oxygen-containing gas such as flue gas or a mixture of steam and air. For obtaining an effective removal of the organic compounds temperatures higher than 400° C. should be used in the regeneration.

The use of active carbon for the removal of organic compounds from water has three drawbacks. The principal drawback is connected with the nature of the organic compounds to be removed; the other two drawbacks are connected with the regeneration and the adsorption process. As to the nature of the organic compounds to be removed the following should be remarked. Active carbon shows a high adsorption capacity when it is used for removing organic compounds from water, which compounds have a low solubility in water, such as hydrocarbons. However, for the removal of organic compounds from water, which compounds contain in addition to carbon and hydrogen at least one oxygen and/or nitrogen atom and which organic compounds have in addition a solubility in water at 20° C. of more than 1g/100 ml, the adsorption capacity of active carbon is very unsatisfactory. For the sake of brevity, organic compounds which contain in addition to carbon and hydrogen at least one oxygen and/or a nitrogen atom and which organic compounds have, in addition, a solubility in water at 20° C. of more than 1g/100 ml, will in this patent application further be designated as organic hetero compounds. As regards the regeneration the following should be remarked. In the regeneration of active carbon by a high-temperature treatment a large amount of heat is liberated. In view of ineffective temperature control, the regeneration of active carbon in a fixed bed is not suitable. Therefore, the regeneration is usually carried out on active carbon which is in fluidized form. In spite of this precaution, in each regeneration treatment a considerable amount of the active carbon will be lost by combustion. As active carbon is a soft material, its particle size will decrease appreciably due to attrition when the carbon is regenerated in fluidized form, so that after each regeneration treatment a considerable amount of the active carbon has too small a particle size to be suitable for further use. As regards the adsorption process the following may be said. For the sake of simple processing, adsorption processes with alternately an adsorption step and a regeneration step are preferably carried out in such a way that the adsorbent has the same form in both steps, i.e. in both steps either the form of a fixed bed or the fluidized form. As stated hereinbefore, both embodiments are suitable for the adsorption step in the separation of organic compounds from water by means of active carbon. When the adsorption step is carried out using active carbon in the fluidized form, the particle size will decrease appreciably due to attrition, just as with the regeneration of active carbon in the fluidized form, so that after each adsorption step a considerable part of the active carbon will have too small a particle size to be suitable for further use. In this connection distinct preference is given to carrying out the adsorption over active carbon which is present in the form of a fixed bed. However, simple processing as described above, in which the adsorbent has the same form in both treating steps, is not possible then. In view of the problems connected with the regeneration of active carbon, in daily practice regeneration is often omitted. A process in which active carbon is used only once is of course very costly.

It will be clear from the above that for the removal of organic hetero compounds from water an adsorbent is needed that does not have the drawbacks connected with the use of active carbon. Applicants have carried out an investigation concerning this subject. As the aim of the investigation was to find an adsorbent having, inter alia, a thermal stability sufficient to enable the adsorbent to be regenerated by high-temperature treatment without appreciable combustion losses, the investigation was restricted to inorganic materials. Both amorphous and crystalline inorganic materials were included in the investigation. Amorphous alumina, amorphous silica and the crystalline aluminosilicates mordenite and faujasite were found to be unsuitable for the present purpose. These materials do have a thermal stability that is sufficiently high to make them eligible for use, but their adsorption capacity for organic hetero compounds is still considerably lower than that of active carbon.

It has now been found that certain crystalline iron silicates which have recently been synthesized for the first time, as described in U.S. Pat. No. 4,208,305 incorporated by reference, are pre-eminently suitable for use as adsorbent for the removal of organic hetero compounds from water.

SUMMARY OF THE INVENTION

The present patent application therefore relates to a process for the purification of water which contains organic hetero compounds by contacting the water with a crystalline iron silicate as hereinafter defined. More particularly the invention provides a process for the purification of water, containing at least one organic compound comprising carbon, hydrogen and at least one atom selected from oxygen and nitrogen, said organic compound having a solubility in water at 20° C. or more than 1g/100 ml, which process comprises contacting said water as feed in a contact zone with a crystalline iron silicate having the following properties:

(a) thermally stable up to a temperature of at least 600° C., (b) an X-ray powder diffraction pattern showing, inter alia, the reflections given in Table A of the specification, (c) in the formula which represents the composition of the silicate, expressed in moles of the oxides, and in which oxides of hydrogen, alkali metal and/or alkaline-earth metal, silicon and iron are present, the $Fe_2O_3/SiO_2$ molar ratio (m) is less than 0.1, and separating a water product having lower content of said at least one organic compound than said feed water.

DESCRIPTION OF PREFERRED EMBODIMENTS

The said crystalline iron silicates are characterized in having the following properties:

(a) thermally stable up to a temperature above 600° C., (b) an X-ray powder diffraction pattern showing, inter alia, the reflections given in Table A.

TABLE A

| Cu—Cu K 2 θ | Wavelength 0.15418nm relative intensity |
|---|---|
| 7.8–8.2 | S |
| 8.7–9.1 | M |
| 11.8–12.1 | W |
| 12.4–12.7 | W |
| 14.6–14.9 | W |
| 15.4–15.7 | W |
| 15.8–16.1 | W |
| 17.6–17.9 | W |
| 19.2–19.5 | W |
| 20.2–20.6 | W |
| 20.7–21.1 | W |
| 23.1–23.4 | VS |
| 23.8–24.1 | VS |
| 24.2–24.8 | S |
| 29.7–30.1 | M | wherein the letters used have the following meanings: VS=very strong; S=strong; M=moderate; W=weak; θ angle according to Bragg.

(c) in the formula which represents the composition of the silicate, expressed in moles of the oxides, and in which oxides of hydrogen, alkali metal and/or alkaline-earth metal, silicon and iron are present, the $Fe_2O_3/SiO_2$ molar ratio (for the sake of brevity further designated as m in this patent application) is less than 0.1.

The process according to the invention is used for the removal of organic hetero compounds from water. Examples of organic hetero compounds which may be present in water and which can be removed from it according to the invention are aliphatic monoalcohols, such as methanol, ethanol, propanol-1, propanol-2, butanol-1 and butanol-2; aliphatic dialcohols, such as glycol; aliphatic trialcohols, such as glycerol; aromatic alcohols, such as pheno and creosols; aldehydes, such as formaldehyde, acetaldehyde and propionaldehyde; ketones, such as acetone, methyl ethyl ketone; cyclic ethers, such as tetrahydrofuran, dioxane and epichlorohydrin; carboxylic acids, such as formic acid, acetic acid and propionic acid; primary amines, such as methylamine, ethylamine, propylamine and butylamine; secondary amines, such as diethylamine and diisopropylamine; diamines, such as ethylenediamine; and alkanolamines, such as ethanolamine, diethanolamine and triethanolamine; heterocyclic nitrogen compounds, such as N-methylpyrrolidone; and heterocyclic sulphur compounds, such as sulpholane.

The lowest content of organic hetero compounds in water at which it is still worth while to use the process according to the invention is substantially determined by the nature of the organic hetero compounds and the intended use of the purified water. Thus when poisonous substances such as phenols and amines are present in water which, after purification, is intended to serve as drinking water, the process according to the invention will still be applied to water which contains only a very small amount of these compounds, in contrast with a situation where relatively harmless compounds, such as lower aliphatic alcohols, are present in water which, after purification, will be discharged as waste water. The highest content of organic hetero compounds at which it is still worth while to use the process according to the invention is substantially determined by economic considerations, such as the amount of water that can be purified with a certain amount of adsorbent, before regeneration of the adsorbent is necessary. As a rule, the process according to the invention will not be applied to water containing less than 10 ppmw or more than 10,000 ppmw organic hetero compounds.

The process according to the invention may be used both for the removal of organic hetero compounds from liquid water and for the removal of such compounds from water vapour.

The purification of water according to the invention may be effected by contacting the water with the crystalline iron silicate which is either in the form of a fixed bed, or in fluidized form. In the regeneration of the crystalline iron silicate, which is preferably effected by contacting the iron silicate at a temperature higher than 400° C. with an oxygen-containing gas, the iron silicate may also be in the form of a fixed bed or in fluidized form.

In the process according to the invention distinct preference is given, for both the adsorption and the regeneration, to a crystalline iron silicate which is in the form of a fixed bed. If the water which is purified according to the invention contains, in addition to organic hetero compounds, other organic compounds, the latter will as a rule be adsorbed, at least partly, together with the organic hetero compounds by the crystalline iron silicate.

Although the crystalline silicates which are used as the adsorbent in the process according to the invention are designated as iron silicates, they may contain, in addition to iron, a small amount of aluminum. The silicon compounds which are suitable from an economic point of view for the preparation of crystalline silicates on a technical scale as a rule contain a small amount of aluminum as contaminant. This aluminum is usually found, at least partly, in the prepared silicate.

The iron silicates that are used in the process according to the invention have been defined, inter alia, with reference to the X-ray powder diffraction pattern. This pattern should contain, inter alia, the reflections shown in Table A. The complete X-ray powder diffraction pattern of a typical example of a silicate suitable for use according to the invention is shown in Table B (Radiation Cu-K; wavelength: 0.15418 nm).

TABLE B

| 2 θ | relative intensity (100 . I/I$_o$) | description |
|---|---|---|
| 8.00 | 55 | SP |
| 8.90 | 36 | SP |
| 9.10 | 20 | SR |
| 11.95 | 7 | NL |
| 12.55 | 3 | NL |
| 13.25 | 4 | NL |
| 13.95 | 10 | NL |
| 14.75 | 9 | BD |
| 15.55 | 7 | BD |
| 15.95 | 9 | BD |
| 17.75 | 5 | BD |
| 19.35 | 6 | NL |
| 20.40 | 9 | NL |
| 20.90 | 10 | NL |
| 21.80 | 4 | NL |
| 22.25 | 8 | NL |

TABLE B-continued

| 2 θ | relative intensity (100 . I/I$_o$) | description |
|---|---|---|
| 23.25 | 100$^x$ | SP |
| 23.93 | 45 | SP |
| 24.40 | 27 | SP |
| 25.90 | 11 | BD |
| 26.70 | 9 | BD |
| 27.50 | 4 | NL |
| 29.30 | 7 | NL |
| 29.90 | 11 | BD |
| 31.25 | 2 | NL |
| 32.75 | 4 | NL |
| 34.40 | 4 | NL |
| 36.05 | 5 | BD |
| 37.50 | 4 | BD |
| 45.30 | 9 | BD |

$^xI_o$ = intensity of the strongest separate reflection present in the pattern.

The letters used in Table B for describing the reflections have the following meanings: SP=sharp; SR=shoulder; NL=normal; BD=broad; η=angle according to Bragg.

The crystalline iron silicates which are used as adsorbent in the process according to invention may be prepared from an aqueous mixture as the starting material which contains the following compounds: one or more compounds of an alkali metal and/or an alkaline-earth metal (M), one or more compounds containing an organic cation (R) or from which such a cation is formed during the preparation of the silicate, one or more silicon compounds and one or more iron compounds. The preparation is performed by maintaining the mixture at elevated temperature until the silicate has been formed, and subsequently separating the crystals of the silicate from the mother liquor and calcining them. In the aqueous mixture from which the silicates are prepared the various compounds should be present in the following ratios, expressed in moles of the oxides:

$M_{2/n}O : R_2O = 0.1-20$,
$R_2O : SiO_2 = 0.01-0.5$,
$SiO_2 : Fe_2O_3$ 10;
$H_2O: SiO_2 = 5-50$;
(n is the valency of M).

In the preparation of the silicates it is preferred to start from a base mixture in which M is present in an alkali metal compound and R in a tetraalkylammonium compound, and in particular from a base mixture in which M is present in a sodium compound and R in a tetrapropylammonium compound. The crystalline iron silicates prepared in the above way contain hydrogen ions and alkali metal ions and/or alkaline-earth metal ions. The silicates can be converted by ion exchange either into the hydrogen form, or into the alkali metal and/or alkaline-earth metal form. The conversion of the silicates into the hydrogen form can suitably be effected by treating the silicates once or several times with an aqueous solution of an ammonium salt, followed by calcining. If the organic hetero compounds which have to be removed from the water in the process according to the invention consist substantially of compounds having an acid reaction such as phenols and aliphatic carboxylic acids, it will be preferred to use in the process a silicate which is substantially in the hydrogen form. The conversion of the silicates into the alkali metal and/or alkaline-earth metal form can suitably be carried out by treating the silicates once or several times with an aqueous solution of an alkali metal salt and/or alkaline-earth metal salt, followed by calcining. If the organic hetero compounds which have to be removed from the water in the process according to the invention consist substantially of compounds with a basic reaction, such as amines, it will be preferred to use in the process a silicate which is substantially in the alkali metal and/or alkaline-earth metal form.

The invention will now be explained with reference to the following example.

EXAMPLE

Two crystalline iron silicates (silicates 1 and 2) were prepared by heating mixtures of $SiO_2$, NaOH, $[(C_3H_7)_4N]OH$ and $Fe(NO_3)_3$ for 24 hours in water in an autoclave at 150° C. under autogenous pressure. After the reaction mixtures had cooled down, the silicates formed were filtered off, washed with water until the pH of the wash water was about 8, dried at 120° C. and calcined at 500° C.

Silicates 1 and 2 had the following properties:
(a) thermally stable up to a temperature above 800° C.,
(b) an X-ray powder diffraction pattern, substantially equal to the one given in Table B.
(c) the value of m was 0.0103 for silicate 1 and 0.0143 for silicate 2.

The molar composition of the aqueous mixtures from which silicates 1 and 2 were prepared can be represented as follows: $Na_2O.[1.5 (C_3H_7)_4N]_2O$. x $Fe_2O_3.25 SiO_2.450 H_2O$, wherein the value of x is 0.25 for silicate 1 and 0.33 for silicate 2.

From silicates 1 and 2 silicates 3 and 4 were prepared respectively, by boiling silicates 1 and 2 with 1 molar $NH_4NO_3$ solution, washing with water, drying at 120° C. and calcining at 500° C. Silicates 3 and 4 were tested for their suitability for the purification of water. The following adsorbents were included in the investigation: an amorphous silica with a surface area of 219 m$^2$/g, an amorphous alumina with a surface area of 164 m$^2$/g, an active carbon with a surface area of 110 m$^2$/g, H-mordenite and H-faujasite. The test was carried out by mixing 1 g adsorbent with 10 ml water containing 1000 ppmw of an organic compound and shaking the mixture for 3 hours at 25° C. After each shaking experiment the organic compound content of the treated water was measured. All the organic compounds included in the investigation had a solubility in water at 20° C. of more than 1 g/100 ml. In the experiments 1–4 with amorphous silica, amorphous alumina, H-mordenite and H-faujasite applied to water containing methyl ethyl ketone, and in the experiments 5–8 with the same adsorbents applied to water containing propanol-2, the organic compound content of the treated water was still higher than 900 ppmw. The results of the other experiments are given in Table C.

TABLE C

| Experiment No. | Organic Compound | Adsorbent | Organic compound content of the treated water, ppmw |
|---|---|---|---|
| 9 | Methyl ethyl ketone | active carbon | 10 |
| 10 | propanol-2 | " | 40 |
| 11 | butylamine | " | 33 |
| 12 | N-methyl-pyrrolidone | " | 4 |
| 13 | sulpholane | " | 30 |
| 14 | ethanol | " | 430 |
| 15 | acetone | " | 40 |
| 16 | butanol-1 | " | 5 |
| 17 | methyl ethyl | silicate 3 | 2 |

TABLE C-continued

| Experiment No. | Organic Compound | Adsorbent | Organic compound content of the treated water, ppmw |
|---|---|---|---|
| | ketone | | |
| 18 | propanol-2 | " | 9 |
| 19 | butylamine | " | 0.25 |
| 20 | N-methyl-pyrrolidone | " | 1.8 |
| 21 | sulpholane | " | 10 |
| 22 | ethanol | silicate 4 | 212 |
| 23 | acetone | " | 15 |
| 24 | butanol-1 | " | 1 |

Of the above mentioned experiments only those numbered 17–24 are experiments according to the invention. Experiments 1–16 are outside the scope of the invention and have been included for comparison.

What is claimed is:

1. A process for the purification of water, containing at least one organic compound comprising carbon, hydrogen and at least one atom selected from oxygen and nitrogen, said organic compound having a solubility in water at 20° C. of more than 1 g/100 ml, which process comprises contacting said water as feed in a contact zone with a crystalline iron silicate having the following properties:

(a) thermally stable up to a temperature above 600° C.,
   (b) an X-ray powder diffraction pattern showing, inter alia, the reflections given in Table A of the specification,
   (c) in the dehydrated form the following overall composition, expressed in moles of the oxides:

$(1.0\pm0.3)(R)_{2/n}O.[a\ Fe_2O_3.b\ Al_2O_3.c\ Ga_2O_3].y\ (d\ SiO_2.e\ (GeO_2))$, where
   R = one or more monovalent or bivalent cations,
   $a > 0.1$;
   $b > 0$,
   $c > 0$,
   $a+b+c = 1$;
   $y > 10$,
   $d > 0.1$,
   $e > 0$,
   $d+e = 1$; and
   $n =$ the valency of R;

and in which oxides of hydrogen, alkali metal and/or alkaline-earth metal, silicon and iron are present, and the $Fe_2O_3/SiO_2$ molar ratio is less than 0.1; and separating a water product having lower content of said at least one organic compound than said feed water.

2. A process according to claim 1 wherein the feed water contains 10–10000 ppmw of organic compounds.

3. A process according to claim 2 wherein said feed water contains 100–5000 ppmw of organic compounds.

4. A process according to claim 1 which comprises the following additional steps: after separating said product, regenerating the crystalline iron silicate, and then purifying additional water containing said at least one organic compound by contacting said water as feed with said regenerated crystalline iron silicate.

5. A process according to claim 4 wherein both the contacting step and the regeneration of the iron silicate are effected on an iron silicate that is in the form of a fixed bed.

6. A process according to claim 4 wherein the regeneration of the iron silicate is carried out by contacting said silicate with an oxygen-containing gas at a temperature higher than 400° C.

7. A process according to claim 1 wherein said feed water is contacted with crystalline iron silicate substantially in the hydrogen form.

8. A process according to claim 1 wherein said feed water is contacted with a crystalline iron silicate substantially in the alkali metal and/or alkaline-earth metal form.

* * * * *